United States Patent [19]

Okugawa et al.

[11] Patent Number: 5,526,064
[45] Date of Patent: Jun. 11, 1996

[54] CABINET MOLDED IN RESIN

[75] Inventors: Takenao Okugawa; Yuji Iwai, both of Kanagawa; Takeshi Nakajima, Tokyo, all of Japan

[73] Assignee: Sony Corporation, Tokyo, Japan

[21] Appl. No.: 407,447

[22] Filed: Mar. 20, 1995

[30] Foreign Application Priority Data

Mar. 29, 1994 [JP] Japan ................................. 6-059102

[51] Int. Cl.$^6$ ............................. H04N 5/65; B28B 7/22
[52] U.S. Cl. ............................................. 348/818; 264/255
[58] Field of Search ........................... 425/DIG. 231; 264/255; 348/818, 836; 312/7.2; 381/88, 90, 188, 205; 181/198, 199, 144

[56] References Cited

U.S. PATENT DOCUMENTS 4,640,381 2/1987 Tsuchiya .
4,754,852 7/1988 Mulé .
5,167,896 12/1992 Hirota .

Primary Examiner—Edward L. Coles, Sr.
Assistant Examiner—Shahreen Ali
Attorney, Agent, or Firm—Jay H. Maioli

[57] ABSTRACT

A cabinet molded in resin has a grill portion molded in resin by using a predetermined metal mold and having a plurality of holes of small diameter defined in the vertical and horizontal directions. This cabinet is composed of a plurality of substantially straight-lined reinforcing ribs formed on the rear surface of the grill portion, wherein the reinforcing ribs are disposed with a predetermined angle with respect to the direction in which a resin supplied from a resin injection nozzle to the metal mold is flowed upon molding and the reinforcing ribs cross one another.

6 Claims, 4 Drawing Sheets

CABINET MOLDED IN RESIN

BACKGROUND OF THE INVENTION

1. Field of the Invention

The present invention relates to a cabinet molded in resin for use with a cabinet of a television receiver, for example.

2. Description of the Related Art

FIG. 1 of the accompanying drawings shows a cabinet of a television receiver. As shown in FIG. 1, there is provided a television receiver 1 which includes a cathode ray tube (CRT) 2 disposed at the central portion of the front surface thereof as an image display portion and left and right grill portions 3 formed on a cabinet of the cathode ray tube 2. The grill portions 3 have a plurality of holes of very small diameter disposed close together in the vertical and horizontal directions. The left and right grill portions 3 have speaker devices 4 incorporated therein. Sounds reproduced from the speaker devices 4 are emanated to the outside of the cabinet through the holes defined on the left and right grill portions 3.

It is customary that a grill portion of a cabinet of a television receiver is composed of a cabinet molded in synthetic resin and a metal plate called punching net having very small holes attached to the cabinet or that a grill portion is composed of a cabinet molded in synthetic resin and a fiber material having a gas permeability, such as a SARAN (trade name of polyvinylidene chloride manufactured by Dow Chemical Co., Ltd.) net bonded to the cabinet. When however the grill portion is made of different materials as described above, it takes much time to manufacture cabinets of television receivers and television receivers become expensive.

To solve the above-mentioned problem, it is proposed to form a grill portion by using only a synthetic resin. According to this previously-proposed method, a grill portion having a plurality of holes of very small diameter disposed close together in the vertical and horizontal directions can be made by the same resin material which forms a cabinet.

FIG. 2 is a perspective view of an example of a grill portion 3 made of a synthetic resin and showing the grill portion 3 of the cabinet from the rear surface side.

As shown in FIG. 2, the grill portion 3 has a plurality of very small holes 5 (e.g., diameter of the hole 5 is about 1 mm) constructing the grill portion 3. These holes 5 are defined on the grill portion 3 close together in the vertical and horizontal directions. The grill portion 3 reduces its thickness at the portions of the holes 5 as compared with those of other portions thereof. Reinforcing ribs 6 are formed on the grill portion 3 at substantially equal spacing in order to reinforce the thin portions of the holes 5. Thicknesses of the portions of the reinforcing ribs 6 are formed are substantially the same as those of other portions of the grill portion 3 of the cabinet so that the portions of the reinforcing ribs 6 increase their thicknesses as compared with the portions of the holes 5. Therefore, the thin portions of the holes 5 can be reinforced.

The reinforcing ribs 6 function also as so-called flow leaders. The flow leaders support resin to properly flow when the cabinet is molded in resin. Specifically, since the reinforcing ribs 6 are disposed on the grill portion 3 with a proper interval, a resin material supplied from the side surface side of the cabinet along dashed arrows when the cabinet is molded in resin can be flowed through the portions of the reinforcing ribs 6 and filled up to the front surface side of the cabinet, thereby the cabinet being molded in resin satisfactorily.

If however the grill portion 3 is molded in synthetic resin, as shown in FIG. 2, there is then the disadvantage that opening portions 7 into which the resin for molding is not filled are produced on the portions of the holes 5 distant from the reinforcing ribs 6. Specifically, when the cabinet is molded in synthetic resin, the resin is mainly flowed in the grill portion 3 at its relatively thick portions of the reinforcing ribs 6 and the resin is difficult to be filled into the portions of the holes 5 distant from the reinforcing ribs 6, causing the opening portions 7 to be produced easily. Therefore, it is difficult to mold the grill portion having a plurality of very small holes disposed close together to a resin molded assembly of relatively large size, such as the cabinet of the television receiver.

In order to eliminate the above-mentioned disadvantage, the number of the reinforcing ribs 6 has to be increased. Since however the holes 5 cannot be formed on the portions of the reinforcing ribs 6, if the number of the reinforcing ribs 6 is increased, then the opening area that is provided by the holes 5 is unavoidably reduced, disabling the grill portion 3 to function as the sound emanating portion of the speaker. Therefore, there is a limitation in increasing the number of the reinforcing ribs 6.

SUMMARY OF THE INVENTION

In view of the aforesaid aspect, it is an object of the present invention to provide a cabinet molded in resin in which a grill portion having very small holes disposed close together can satisfactorily be molded to a resin molded assembly of a relatively large size.

According to an aspect of the present invention, there is provided a cabinet molded in resin has a grill portion molded in resin by using a predetermined metal mold and having a plurality of holes of small diameter defined in the vertical and horizontal directions. This cabinet is composed of a plurality of substantially straight-lined reinforcing ribs formed on the rear surface of the grill portion, wherein the reinforcing ribs are disposed with a predetermined angle with respect to the direction in which a resin supplied from a resin injection nozzle to the metal mold is flowed upon molding and the reinforcing ribs cross one another.

In this case, an angle formed by the reinforcing ribs is selected to be an acute angle.

Further, a cabinet molded in resin constructs a cabinet for a television receiver and grill portions are used as sound emanating portions of speakers incorporated within the television receiver.

According to the present invention, since the reinforcing ribs are disposed at the predetermined angle with respect to the direction in which the resin supplied from the resin injection nozzle to the metal mold upon molding is flowed, the reinforcing ribs function to slightly block the flow of the resin upon molding so that the resin is diffused around the portions where the reinforcing ribs are formed. Further, since the reinforcing ribs are disposed so as to cross one another, the resins flowed to the crossing point are broken one another and diffused to the outside. Therefore, the resin can satisfactorily be diffused into the grill portion.

According to the present invention, since the reinforcing ribs are disposed at the predetermined angle with respect to the direction in which the resin supplied from the resin injection nozzle to the metal mold upon molding is flowed, the reinforcing ribs function to block the flow of the resin upon molding so that the resin can be diffused around the portions where the reinforcing ribs are formed. Further, since the reinforcing ribs are disposed so as to cross one another, the resins flowed to the crossing point are broken one another and diffused to the outside. Therefore, the resin can satisfactorily be diffused into the grill portion, thereby preventing the opening portion in which the resin is not filled from being produced in the grill portion.

In this case, if the angle at which the reinforcing ribs cross one another is selected to be an acute angle, then the resin can properly be diffused into the crossing portion with the result that the resin can satisfactorily be diffused into the grill portion. Therefore, the resin can satisfactorily be filled into the grill portion and the cabinet can be satisfactorily molded in resin.

Accordingly, it becomes possible to mold the grill portion such as the speaker sound emanating portion to the large resin molded assembly, such as the cabinet of the television receiver. Therefore, the cabinet can be manufactured with ease.

DETAILED DESCRIPTION OF THE PREFERRED EMBODIMENT

A cabinet according to an embodiment of the present invention will hereinafter be described with reference to FIGS. 3 to 6.

Figure 3:
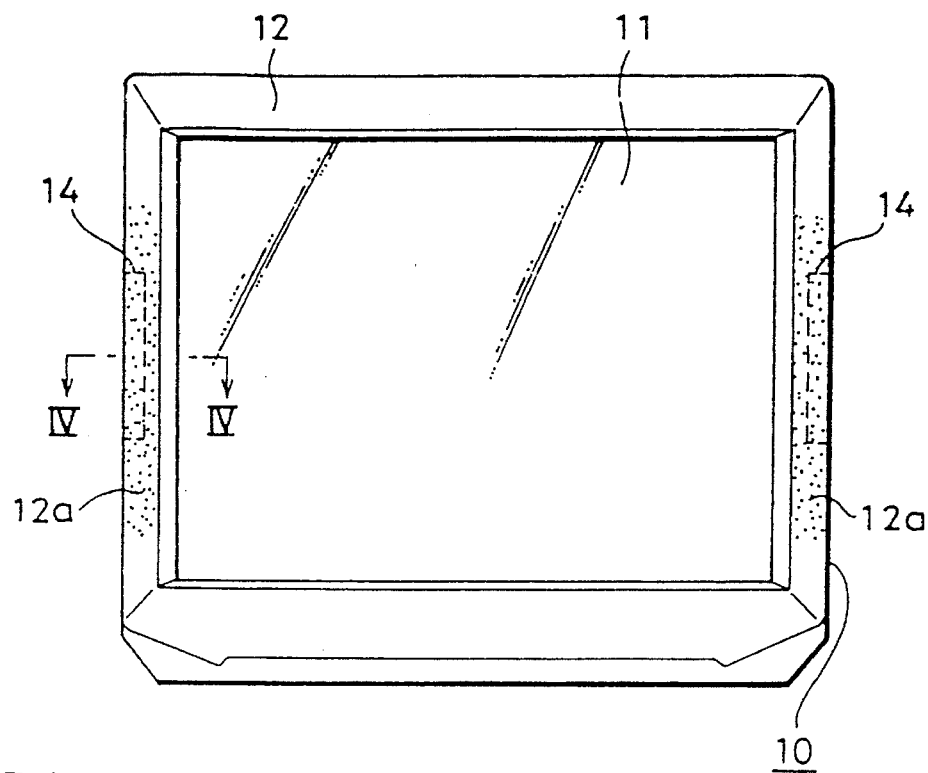
FIG. 3 is a front view of a television receiver to which a cabinet according to the embodiment of the present invention is applied.

According to this embodiment, a cabinet according to the present invention is applied to a cabinet of a television receiver. FIG. 3 shows an arrangement of a television receiver 10. As shown in FIG. 3, the television receiver 10 is composed of a cathode ray tube (CRT) 11 disposed at the central portion of the front surface thereof as an image display portion and a cabinet 12 disposed so as to cover the region ranging from the portion surrounding the portion serving as the image display portion on the front surface of the cathode ray tube 11 to the rear end portion of the television receiver 10. The cabinet 12 includes left and right grill portions 12a which are molded on their front surface sides to the cabinet 12 by synthetic resin and which have very small holes disposed thereon close together. Speaker devices 14 are disposed on the inner part of the left and right grill portions 12a. When the cabinet 12 is molded in resin by a metal mold, a resin injection nozzle is disposed near the portion which serves as the side surface portion of the television receiver 10. Then, a resin is filled into the cabinet 12 from this side surface portion to the front surface side to mold the cabinet 12.

The grill portion 12a of the cabinet 12 will be described in detail below.

Figure 4:
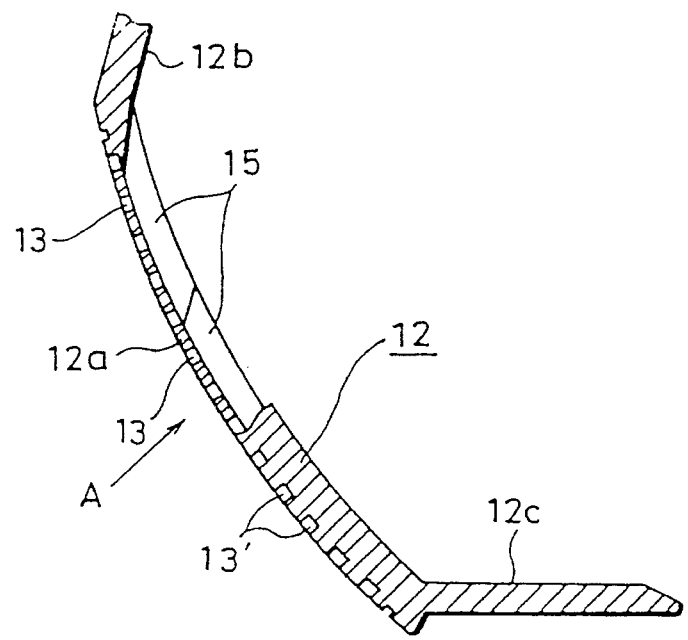
FIG. 4 is a cross-sectional view taken along the line IV—IV in FIG. 3.

FIG. 4 is a cross-sectional view taken along the line IV—IV in FIG. 3 and illustrating a cross-section of the grill portion 12a. As shown in FIG. 4, the grill portion 12a is vertically disposed between a cabinet side surface portion 12b constructing the side surface portion of the television receiver 10 and a cabinet front surface portion 12c disposed around the portion which becomes the image display portion. According to this embodiment, the thickness of the grill portion 12a is about 1 mm.

Holes 13 of very small diameter, e.g., about 1 mm are formed on the grill portion 12 close together in a so-called punching metal fashion (i.e., the same state that very small holes are formed on the metal plate by punching). The portions of the holes 13 are reduced in thickness as compared with thicknesses (i.e., about 2 to 5 mm) of other portions of the grill portion 12a.

Figure 5:
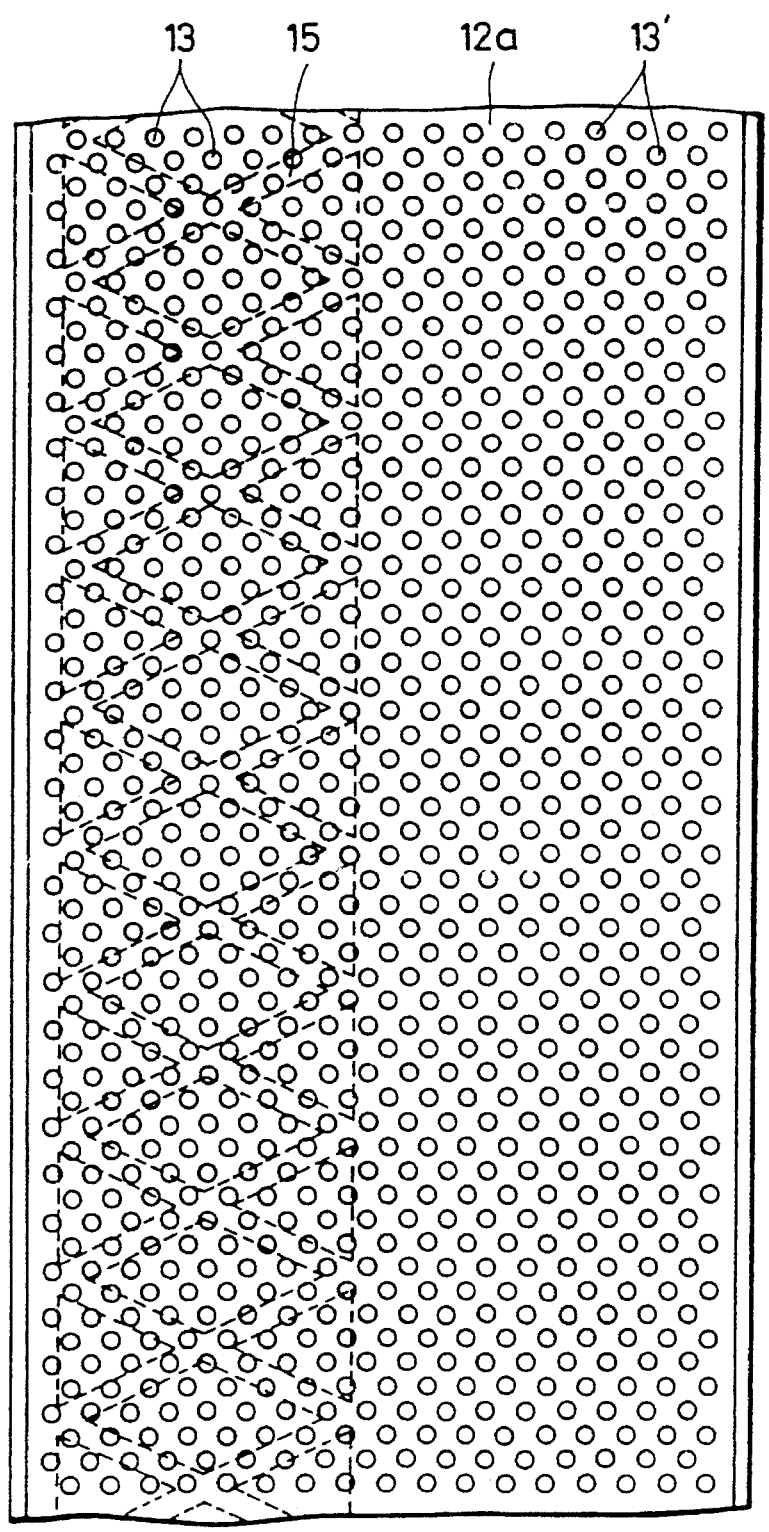
FIG. 5 is a front view showing a grill portion from the direction shown by an arrow A in FIG. 4.

Reinforcing ribs 15 are formed on the rear surfaces of the portions of the holes 13. FIG. 5 is a front view of the grill portion 12a. The reinforcing ribs 15 are formed on the rear surfaces of the portions of the holes 13 as shown by dotted lines in FIG. 5.

Figure 6:
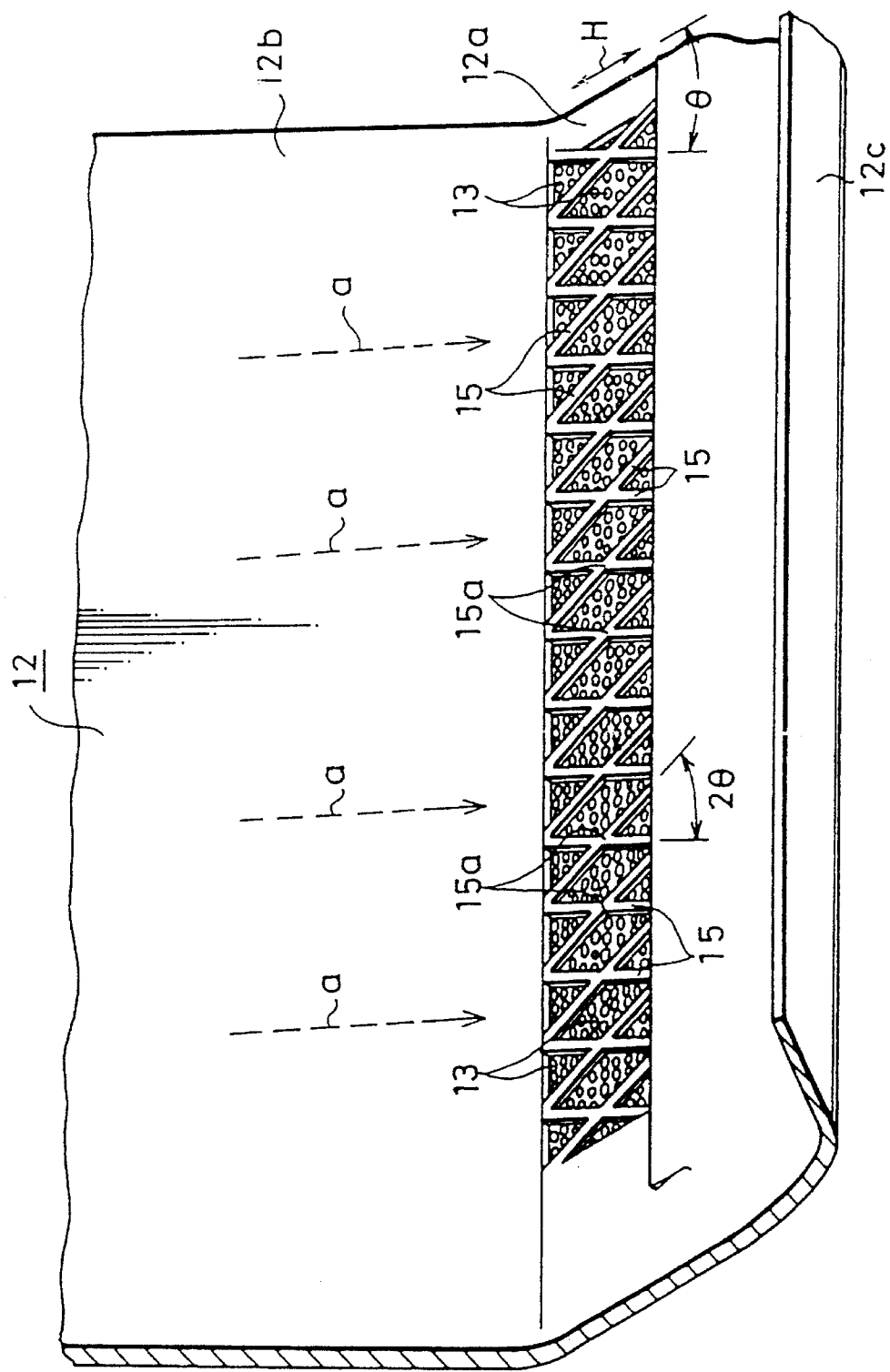
FIG. 6 is a rear view, partly in perspective form, of a main portion of a cabinet according to the embodiment of the present invention.

The reinforcing ribs 15 provided on the grill portion 12a according to this embodiment are formed by successively disposing straight-lined ribs crossing each other in an X-shape as shown in FIGS. 5 and 6. FIG. 6 is a perspective view, partly in cross-sectional form, showing the grill portion 12a from the rear surface side. A portion near the grill portion 12a of the cabinet 12 is illustrated in a cross-sectional fashion in FIG. 6. The reinforcing ribs 15 are inclined at a predetermined angle θ (e.g., θ is 25°) with respect to a direction H which becomes horizontal when the cabinet 12 is assembled. The reinforcing ribs 15 cross the reinforcing ribs 15 inclined at substantially central portions 15a in the opposite directions. An angle at which the reinforcing ribs 15 cross one another becomes 2θ (e.g., 50°) as shown in FIG. 6.

The reinforcing ribs 15 thus crossed one another are successively disposed on the rear surface of the grill portion 12a. The thickness of the portion to form the reinforcing rib 15 is substantially equal to the thickness around the grill portion 12a and is about 2 mm, for example.

According to this embodiment, as shown in FIGS. 4 and 5, hollows 13' are formed on the side of the holes 13 at the same interval as the interval at which the holes 13 are formed. Therefore, when the cabinet 12 is seen from the outside, the grill portion 12a seems to be extended up to the hollows 13' from a design standpoint. Holes which overlap the portions of the reinforcing ribs 15 are not formed a the holes but become the hollow 13'.

According to the cabinet 12 in which the reinforcing ribs 15 are disposed as described above, the grill portion 12a having the very small holes 13 can satisfactorily be molded to the cabinet 12.

Specifically, according to the cabinet 12 of this embodiment, since the resin injection nozzle used upon resin molding is disposed near the side surface portion 12b, the resin is flowed from the side surface side to the front surface side within the metal mold as shown by dotted arrows a in FIG. 6 when the cabinet 12 is molded.

According to this embodiment, since the reinforcing ribs 15 are inclined with the predetermined angle θ, the reinforcing ribs 15 resist the flow of resin by only the angle θ in the metal mold for molding the grill portion 12a, whereby the resin can be diffused to the thin grill portion 12a. Further, the reinforcing ribs 15 cross one another with the angle of 2θ at the central portion 15a so that resins flowed along the reinforcing ribs 15 of the opposite directions are broken on the crossing portions. Then, by a resulting force generated when the resins are broken on the crossing portions, the resin can be diffused from the crossing portion 15a to the surrounding grill portion 12a. Therefore, the resin can be diffused to the whole of the thin grill portion 12a, thereby making it possible to prevent the opening portion in which the resin is not filled from being produced. Furthermore, the resin can be flowed also to the front surface portion 12c side of the cabinet 12 through the reinforcing ribs 15, whereby the whole of the cabinet 12 can satisfactorily be molded in resin.

Since the cabinet 12 having the thin grill portion 12a can be molded in resin as described above, the grill portion which is the different assembly need not be attached to the cabinet. Therefore, the cabinet for television receiver can be manufactured with ease and the television receiver can be made inexpensive. Moreover, since the cabinet is molded in resin, the grill portion can be prevented from being detached later unlike the case that the grill portion serving as the different assembly is bonded to the cabinet. Thus, the cabinet according to the embodiment of the present invention can be prevented from suffering from aging change as a product.

Figure 1:
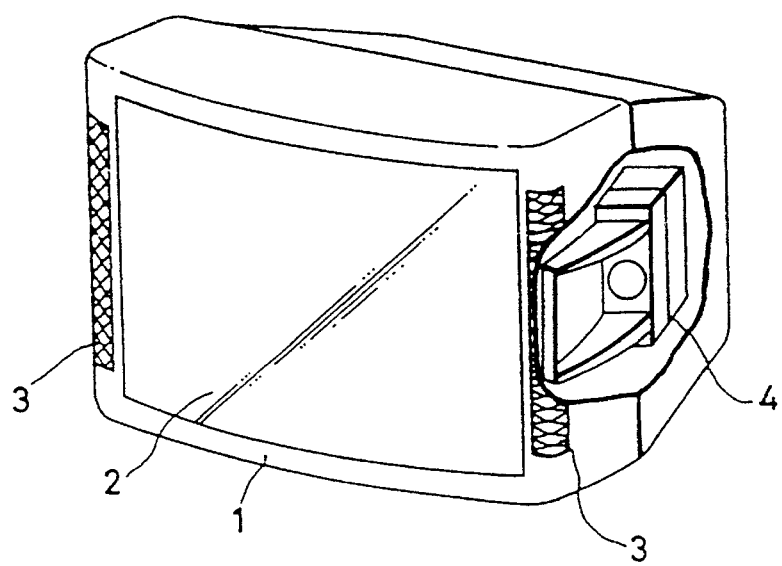
FIG. 1 is a perspective view, partly in cross-sectional form, of an example of a television receiver.
Figure 2:
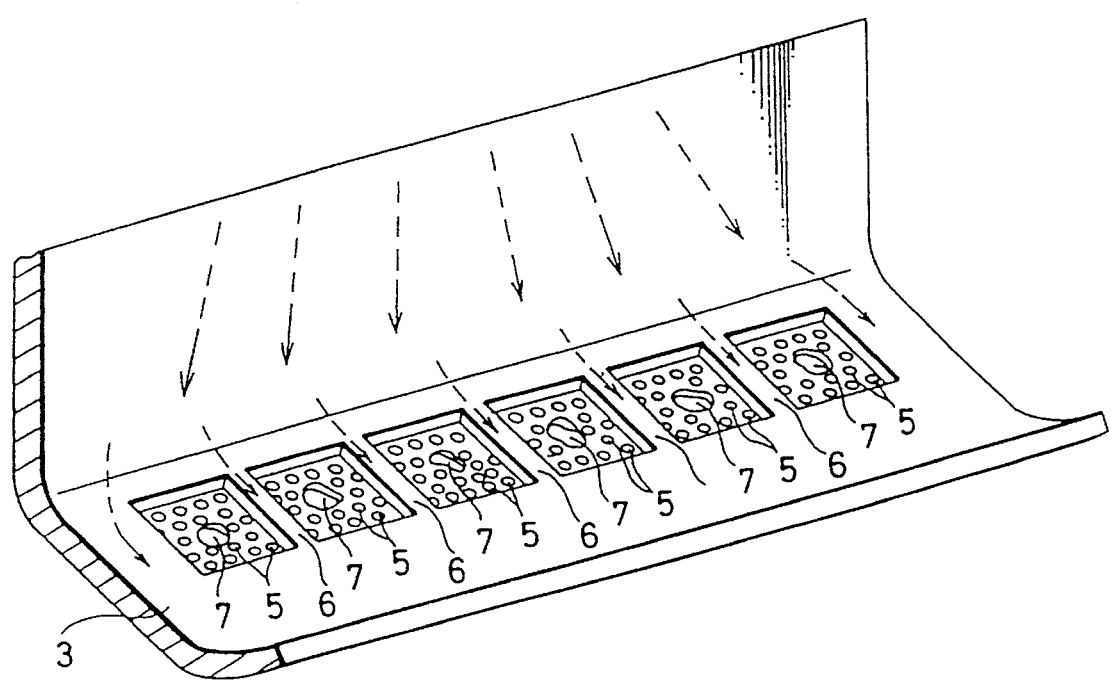
FIG. 2 is a perspective view showing an example of a molded state of a cabinet from a rear surface side.

If the angle at which the reinforcing ribs 15 cross one another at the central portion 15a is selected to be an acute angle (i.e., 90° or smaller), then the resin can be flowed to the grill portion 12a satisfactorily. Specifically, if the angle at which the reinforcing ribs 15 cross one another is selected to be an obtuse angle, then it is frequently observed that the resin cannot satisfactorily be diffused to the surrounding portion of the grill portion 12a even when the resins that had been flowed along the reinforcing ribs 15 of the opposite directions are broken on the crossing portion 15a. In this case, if the reinforcing ribs 15 cross one another at the acute angle with respect to the direction in which the resin is flowed according to this embodiment, then the cabinet can satisfactorily be molded under the condition that the opening portion is not produced at all. As compared with the example of the cabinet in which the reinforcing ribs are not crossed at all as shown in FIG. 2, even when the reinforcing ribs cross one another with the obtuse angle, the possibility that the opening portion will be produced can be lowered. Therefore, the cabinet can be molded satisfactorily in its own way.

Further, while the resin injection nozzle used in the resin molding is disposed near the side surface portion 12b of the cabinet 12 as described above, if the position of the resin injection nozzle is changed, then the direction in which the reinforcing ribs are formed has to be changed in correspondence therewith.

Furthermore, while the grill portion is applied to the speaker sound emanating portion of the cabinet of the television receiver as described above, the present invention is not limited thereto and can be applied to resin-molded cabinets of other electronic devices. If the cabinet according to the embodiment of the present invention is applied to the resin-molded assembly of relatively large size, such as the cabinet of the television receiver, then there can be achieved larger effects.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A cabinet molded in resin having a grill portion molded in resin, said cabinet made using a metal mold and said grill portion having a plurality of holes of small diameter defined in vertical and horizontal directions, said cabinet comprising:

a plurality of substantially straight-lined reinforcing ribs formed on a rear surface of said grill portion, wherein said reinforcing ribs are disposed at a predetermined angle with respect to the direction at which resin supplied from a resin injection nozzle to said metal mold flows during molding, wherein said reinforcing ribs cross one another at an acute angle.

2. A cabinet according to claim 1, wherein said reinforcing ribs are disposed so as to cross one another forming a plurality of quadrilateral shapes.

3. A cabinet according to claim 2, wherein said quadrilateral shapes are diamonds.

4. A cabinet according to claim 2, wherein said quadrilateral shapes have a plurality of holes defined therein.

5. A cabinet according to claim 4, wherein said cabinet molded in resin serves as a cabinet of a television receiver having a cathode ray tube.

6. A cabinet according to claim 5, wherein said grill portion serves as a sound emanating portion of a speaker disposed in said television receiver.

* * * * *